(12) United States Patent
Kruglick

(10) Patent No.: US 9,197,653 B2
(45) Date of Patent: Nov. 24, 2015

(54) CROSS-USER CORRELATION FOR DETECTING SERVER-SIDE MULTI-TARGET INTRUSION

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 108 days.

(21) Appl. No.: 13/811,384

(22) PCT Filed: Jun. 5, 2012

(86) PCT No.: PCT/US2012/040866
§ 371 (c)(1),
(2), (4) Date: Jan. 21, 2013

(87) PCT Pub. No.: WO2013/184099
PCT Pub. Date: Dec. 12, 2013

(65) Prior Publication Data
US 2013/0326623 A1     Dec. 5, 2013

(51) Int. Cl.
*H04L 29/06* (2006.01)
*G06F 21/55* (2013.01)
*G06F 21/57* (2013.01)

(52) U.S. Cl.
CPC ............ *H04L 63/1416* (2013.01); *G06F 21/55* (2013.01); *G06F 21/552* (2013.01); *G06F 21/554* (2013.01); *G06F 21/577* (2013.01); *H04L 63/14* (2013.01); *H04L 63/1408* (2013.01); *H04L 63/1458* (2013.01); *G06F 2221/2101* (2013.01); *H04L 63/1441* (2013.01)

(58) Field of Classification Search
CPC . H04L 63/1416; H04L 63/14; H04L 63/1408; H04L 63/1441; H04L 63/1458; G06F 21/55; G06F 21/554; G06F 21/577; G06F 21/552; G06F 2221/2101
USPC .................. 726/22, 23, 24; 713/188; 709/224
See application file for complete search history.

(56) References Cited

U.S. PATENT DOCUMENTS

| | | | |
|---|---|---|---|
| 6,715,084 B2 | 3/2004 | Aaron et al. | |
| 7,603,711 B2 | 10/2009 | Scheidell | |
| 7,752,662 B2 | 7/2010 | Shulman et al. | |
| 7,814,542 B1* | 10/2010 | Day | 726/22 |
| 8,719,627 B2* | 5/2014 | Watson et al. | 714/13 |
| 2002/0083343 A1 | 6/2002 | Crosbie et al. | |

(Continued)

FOREIGN PATENT DOCUMENTS

KR     1020110006398 A     1/2011

OTHER PUBLICATIONS

International Search Report and Written Opinion for PCT/US12/40866, filed Jun. 5, 2012, mailed on Aug. 10, 2012.

(Continued)

*Primary Examiner* — Sarah Su
(74) *Attorney, Agent, or Firm* — Turk IP Law, LLC

(57) ABSTRACT

Technologies are generally described for time-correlating administrative events within virtual machines of a datacenter across many users and/or deployments. In some examples, the correlation of administrative events enables the detection of confluences of repeated unusual events that may indicate a mass hacking attack, thereby allowing attacks lacking network signatures to be detected. Detection of the attack may also allow the repair of affected systems and the prevention of further hacking before the vulnerability has been analyzed or repaired.

19 Claims, 7 Drawing Sheets

(56) References Cited

U.S. PATENT DOCUMENTS

| | | | |
|---|---|---|---|
| 2002/0197978 A1* | 12/2002 | Zavidniak | 455/410 |
| 2003/0084336 A1* | 5/2003 | Anderson et al. | 713/200 |
| 2004/0098623 A1* | 5/2004 | Scheidell | 713/201 |
| 2005/0033976 A1 | 2/2005 | Doherty et al. | |
| 2006/0075491 A1* | 4/2006 | Lyon | 726/22 |
| 2008/0010225 A1* | 1/2008 | Gonsalves et al. | 706/11 |
| 2008/0148398 A1 | 6/2008 | Mezack et al. | |
| 2008/0320583 A1* | 12/2008 | Sharma et al. | 726/12 |
| 2009/0077632 A1* | 3/2009 | Carpenter et al. | 726/3 |
| 2010/0083382 A1 | 4/2010 | Farley et al. | |
| 2011/0029828 A1* | 2/2011 | Bancel et al. | 714/724 |
| 2011/0055385 A1* | 3/2011 | Tung et al. | 709/224 |
| 2011/0219447 A1* | 9/2011 | Horovitz et al. | 726/22 |
| 2011/0288692 A1 | 11/2011 | Scott | |
| 2012/0047501 A1 | 2/2012 | Box | |
| 2012/0059930 A1 | 3/2012 | Devarakonda et al. | |
| 2012/0216191 A1* | 8/2012 | Tsai | 718/1 |
| 2012/0240224 A1* | 9/2012 | Payne et al. | 726/21 |
| 2013/0061322 A1* | 3/2013 | Sethumadhavan et al. | 726/23 |
| 2013/0104230 A1* | 4/2013 | Tang et al. | 726/23 |
| 2013/0133068 A1* | 5/2013 | Jiang | 726/23 |
| 2013/0298184 A1* | 11/2013 | Ermagan et al. | 726/1 |
| 2013/0305093 A1* | 11/2013 | Jayachandran et al. | 714/37 |
| 2013/0318607 A1* | 11/2013 | Reed et al. | 726/23 |
| 2014/0075203 A1* | 3/2014 | Barbu et al. | 713/189 |
| 2014/0143868 A1* | 5/2014 | Shiva et al. | 726/23 |
| 2014/0189862 A1* | 7/2014 | Kruglick | 726/22 |
| 2015/0039904 A1* | 2/2015 | Matsuda et al. | 713/189 |

OTHER PUBLICATIONS

Kessler, "Defenses Against Distributed Denial of Service Attacks," http://www.garykessler.net/library/ddos.html, Nov. 2000.
IBM Proventia."IBM Proventia Web Application Security Configuration Guide Version 1.0" [online]. Dated Jul. 2009. Retrieve on Jul. 30, 2012. Retrieved from the Internet at URL:,<http://publib.boulder.ibm.com/infocenter/sprotect/v2r8m0/topic/com.ibm.ips.doc/pdfs/IBM_WAS_CG_1.0.pdf>, entire document especially pp. 25-26.
"AWS Developer Forums: Kernel vulnerability affects EC2: NULL Pointer Dereference," accessed at https://forums.aws.amazon.com/thread.jspa?threadID=35410, accessed on Sep. 5, 2014, pp. 1-7.
"BizTalk SOA Evangelist," accessed at https://web.archive.org/web/20111211025737/http://geekswithblogs.net/VishnuTiwariBlog/archive/2011/08/30/cloud-secuirty--major-vulnerabilities.aspx, Aug. 30, 2011, pp. 1-3.
"Host-based intrusion detection system," accessed at https://web.archive.org/web/20120523003543/http://en.wikipedia.org/wiki/Host-based_intrusion_detection_system, Last modified on May 11, 2012, pp. 1-5.
"International Business Machines Corp.," accessed at http://www.google.com/finance?q=SoftLayer+Technologies%2C+Inc., Sep. 5, 2014, pp. 1-2.
"JustHost Hosting Server Compromised, More than 1000's of websites at Risk !," accessed at https://web.archive.org/web/20120420005930/http://thehackernews.com/2011/06/justhost-hosting-server-compromised.html, Jun. 23, 2011, pp. 1-5.
"Network intrusion detection system," accessed at https://web.archive.org/web/20140821101421/http://en.wikipedia.org/wiki/Network_intrusion_detection_system, Last modified on Aug. 7, 2015, pp. 1-3.
"Vulnerability Details : CVE-2011-1068," accessed at https://web.archive.org/web/20111012165922/http://cvedetails.com/cve/CVE-2011-1068/, Last Updated on Apr. 21, 2011, p. 1.
Binkley, J. R., and Singh, S., "An Algorithm for Anomaly-based Botnet Detection," SRUTI'06 Proceedings of the 2nd conference on Steps to Reducing Unwanted Traffic on the Internet, vol. 2, pp. 43-48 (Jul. 7, 2006).
Boggs, N., et al., "Cross-domain Collaborative Anomaly Detection: So Far Yet So Close," RAID'11 Proceedings of the 14th international conference on Recent Advances in Intrusion Detection, pp. 142-160 (Sep. 20, 2011).
Kind, A., et al., "Histogram-based traffic anomaly detection," IEEE Transactions on Network and Service Management, vol. 6, Issue 2, pp. 110-121 (Jun. 1, 2009).
Kruegel, C., and Vigna, G., "Anomaly Detection of Web-based Attacks," Proceedings of the 10th ACM conference on Computer and communications security, pp. 251-261 (Oct. 27-31, 2003).
Lawson, N., "Root Labs Rdist, Amazon web services signature vulnerability," accessed at https://web.archive.org/web/20120331091344/http://rdist.root.org/2009/05/20/amazon-web-services-signature-vulnerability/, May 20, 2009, pp. 1-7.
Miller, R., "SoftLayer Hits 100,000 Servers," accessed at http://www.datacenterknowledge.com/archives/2011/12/05/softlayer-hits-100000-servers/?utm-source=feedburner&utm-medium=feed&utm-campaign=Feed%3A+DataCenterKnowledge+(Data+Center+Knowledge), Dec. 5, 2011, pp. 1-2.
Perlroth, N., "Insurance Against Cyber Attacks Expected to Boom," accessed at https://web.archive.org/web/20120225115039/http://bits.blogs.nytimes.com/2011/12/23/insurance-against-cyber-attacks-expected-to-boom/?ref=technology, Posted on Dec. 23, 2011, pp. 1-5.
Phillips, J., "Hosting Firm in Motion Hacked, Thousands of Websites Defaced," accessed at https://web.archive.org/web/20120521121018/http://www.theepochtimes.com/n2/technology/hosting-firm-inmotion-hacked-thousands-of-websites-defaced-62209.html, Sep. 29, 2011, p. 1-2.
Robertson, R., et al., "Using Generalization and Characterization Techniques in the Anomaly-based Detection of Web Attacks," In Proceedings of the 13th Symposium on Network and Distributed System Security (NDSS), pp. 1-15 (Aug. 2006).
International Preliminary Report on Patentability for PCT/US2012/040866 filed Jun. 5, 2012, mailed on Jun. 19, 2014, issued Dec. 9, 2014.

* cited by examiner

CROSS-USER CORRELATION FOR DETECTING SERVER-SIDE MULTI-TARGET INTRUSION

CROSS-REFERENCE TO RELATED APPLICATIONS

This Application is the National Stage filing under 35 U.S.C. §371 of PCT Application Ser. No. PCT/US12/40866 filed on Jun. 5, 2012. The PCT Application is herein incorporated by reference in its entirety.

BACKGROUND

Unless otherwise indicated herein, the materials described in this section are not prior art to the claims in this application and are not admitted to be prior art by inclusion in this section.

Some datacenter attacks may be characterized by the rapid use of zero-day (i.e., new or unpatched) or relatively recent vulnerabilities to compromise tens of thousands of customers before the vulnerabilities are patched. While a majority of the publicized compromises may be at web hosts, zero-day exploits have also been detected at datacenters. Some of these exploits may be fixed within days, others may take months, and professional hackers usually plan for the faster response by attempting to use a vulnerability to compromise thousands of targets (sites, users, accounts) as quickly as possible. As the market for cloud services grows, and cloud service providers massively expand their server count to accommodate customer demand, batch exploitation by hackers via zero-day attacks is likely to continue to be problematic. However, conventional intrusion detection systems may not be able to detect such zero-day attacks.

Another challenge with zero-day attacks is that they are not detected by conventional content or pattern scanning. Heuristic intrusion detection has been demonstrated in many environments, but typically generates so many false positives that it does not scale well and may require prohibitive staff levels for datacenter use. Additionally, heuristic detection may not detect command based hacks (session or terminal hacks), being more capable of network traffic based scanning.

SUMMARY

The present disclosure generally describes technologies related to cross-user correlation for detecting server-side multi-target intrusion.

According to some example embodiments, a method for detecting server-side multi-target intrusions through cross-user correlation may include detecting a low-probability administrative event associated with a user of a datacenter, monitoring confluences of the administrative event within virtual machines of the datacenter across multiple users and/or deployments, and if the administrative event is detected across the multiple users and/or deployments at a level higher than a predefined probability threshold, classifying the administrative event as an attack.

According to other example embodiments, a cloud-based datacenter configured to detect server-side multi-target intrusions through cross-user correlation may include a plurality of virtual machines operable to be executed on one or more physical machines, a virtual machine monitor configured to provide access to the plurality of virtual machines and detect a low-probability administrative event associated with a user based on a list of watched events, and a datacenter controller configured to monitor confluences of the administrative event within virtual machines of the datacenter across multiple users and/or deployments, and if the administrative event is detected across the multiple users and/or deployments at a level higher than a predefined probability threshold, classify the administrative event as an attack.

According to further example embodiments, a computer-readable storage medium may store instructions for detecting server-side multi-target intrusions through cross-user correlation. The instructions may include detecting a low-probability administrative event associated with a user of a datacenter, monitoring confluences of the administrative event within virtual machines of the datacenter across multiple users and/or deployments, and if the administrative event is detected across the multiple users and/or deployments at a level higher than a predefined probability threshold, classifying the administrative event as an attack.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
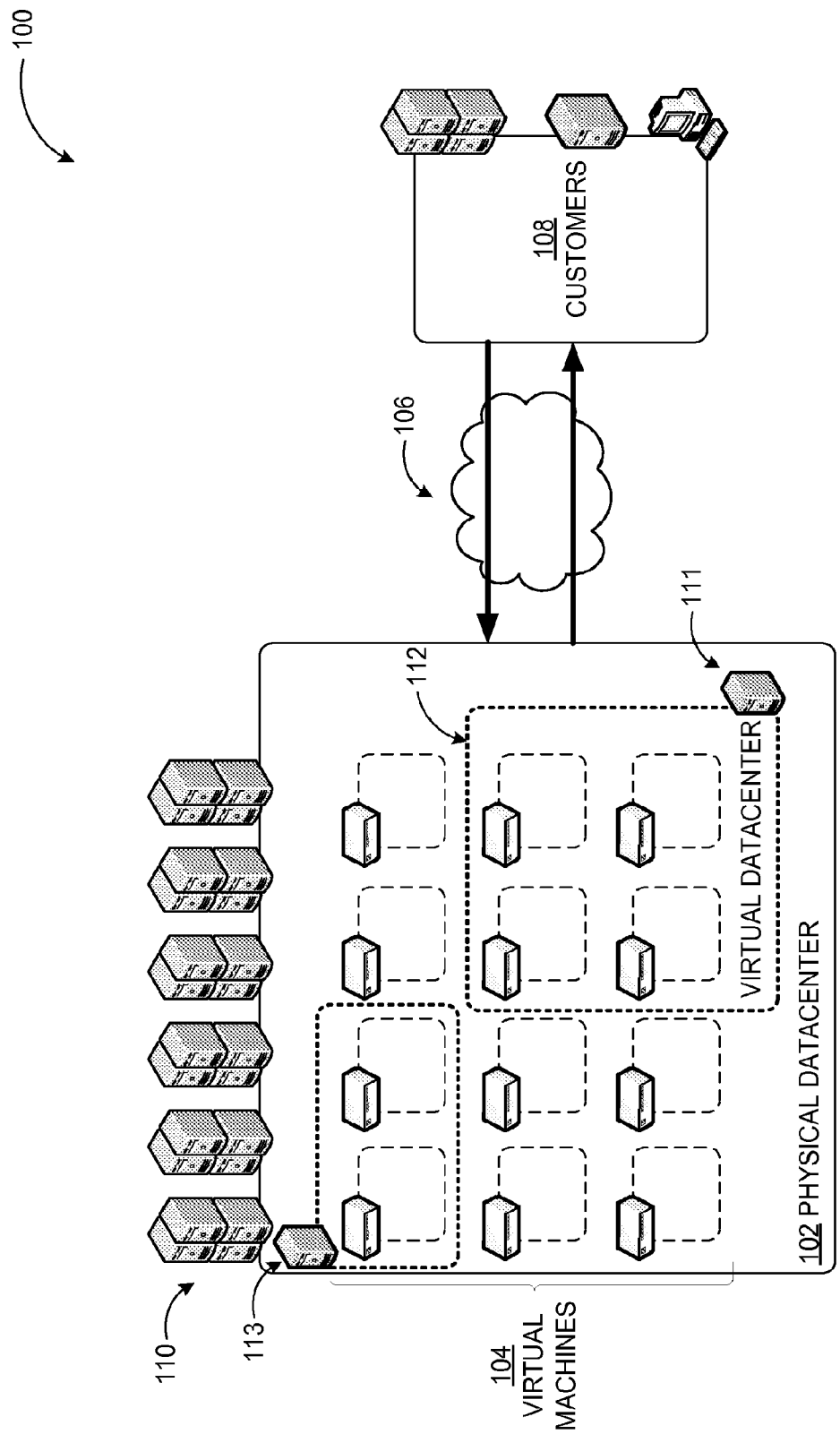
FIG. 1 illustrates an example datacenter, where cross-user correlation may be used for detecting server-side multi-target intrusions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to cross-user correlation for detecting server-side multi-target intrusion.

Briefly stated, technologies are presented for time-correlating administrative events within virtual machines across many users and deployments. The correlation of administrative events enables the detection of confluences of repeated unusual events that may indicate a mass hacking attack, thereby allowing attacks lacking network signatures to be detected. Detection of the attack may also allow the repair of affected systems and the prevention of further hacking before the vulnerability has been analyzed or repaired.

A datacenter as used herein provides services to multiple customers, who—in turn—may provide services through the datacenter to multiple users (in practice the number s of customers and users may be in the thousands or tens of thousands). Each customer may be thought of as a deployment for services such as web applications, data management tools, etc. Thus, a deployment may involve one or more users. An administrative event as described herein includes, but is not limited to, elevation of privileges (e.g., events granting higher or super-user privileges), replacement of executables in virtual machines, changes to user status or files associated with user status, changes to data files associated with users, transfers, update status (e.g. lack of expected auto-updating), unusual port or hardware use, or comparable datacenter events.

FIG. 1 illustrates an example datacenter where cross-user correlation may be used for detecting server-side multi-target intrusions, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

Datacenters have a potential advantage over heuristic detection methods for detecting hack attacks in that they have virtual machine monitors (hypervisors) that have the ability to monitor certain system calls of various users across a large population. A system according to some embodiments, described herein, may utilize hypervisors in detecting new vulnerability attacks during the first moments of an attack wave.

Figure 2:
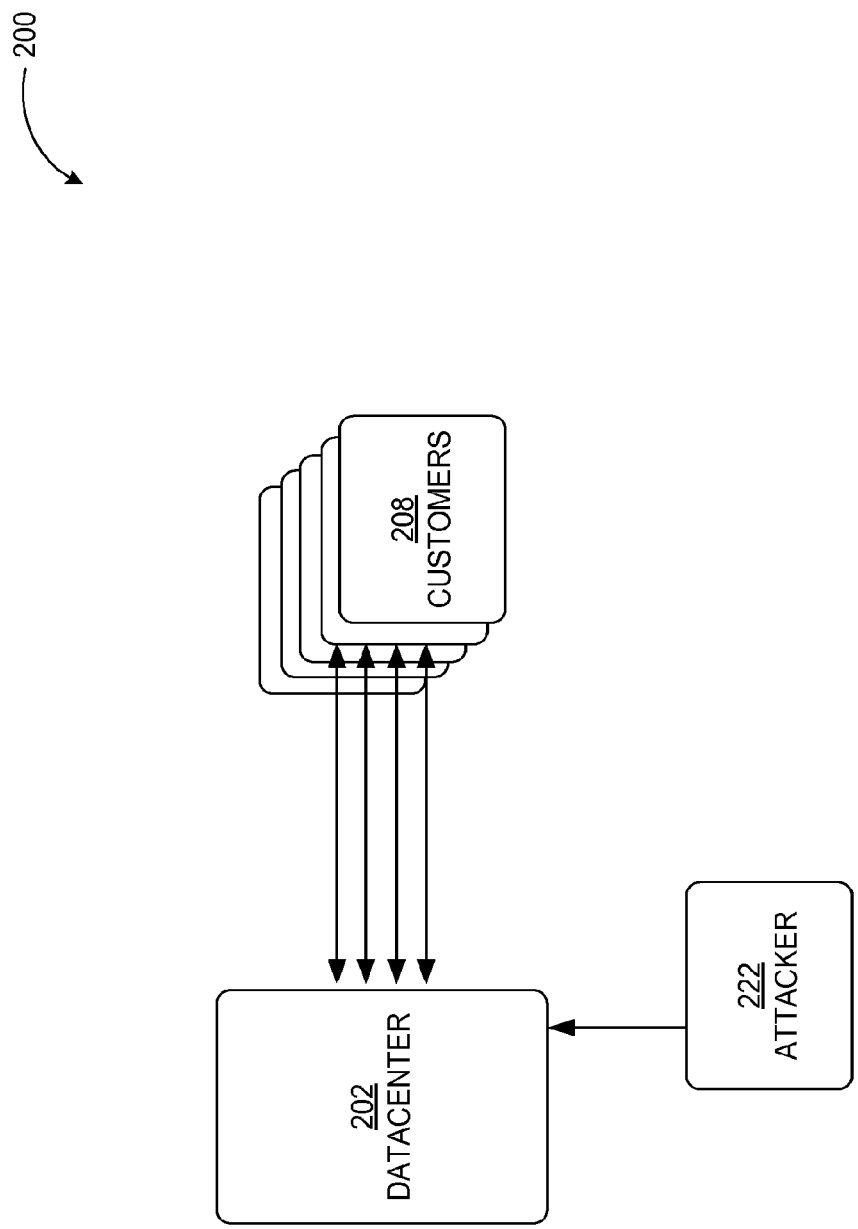
FIG. 2 illustrates conceptually major actors in cross-user correlation-based detection of server-side multi-target intrusions.

FIG. 2 illustrates conceptually major actors in cross-user correlation-based detection of server-side multi-target intrusions, arranged in accordance with at least some embodiments described herein. As shown in a diagram 200, a datacenter 202 (similar to the physical datacenter 102 or the virtual datacenter 112 in FIG. 1) may provide cloud-related data/computing services to one or more customers 208 (similar to the customers 108 in FIG. 1). An attacker 222 may seek to gain access to data stored on the datacenter 202 or services provided by the datacenter 202 by, for example, attacking the datacenter directly, or by attacking via one or more of the customers 208 (e.g., by hacking into a customer account and using that account to compromise the datacenter 202).

Conventional pattern based and heuristic detection techniques employ detection of known content or traffic patterns such as distributed denial-of-service (DDOS) attacks. A system according to embodiments described herein may be capable of detecting previously undetectable attack forms such as Stuxnet and Duqu and enabling a repair and prevention strategy that can stop and repair zero-day attacks before the vulnerabilities have even been determined. In particular, a detection technique according to some embodiments may thwart datacenter mass attacks that are potentially of most reputational danger to datacenters.

Figure 3:
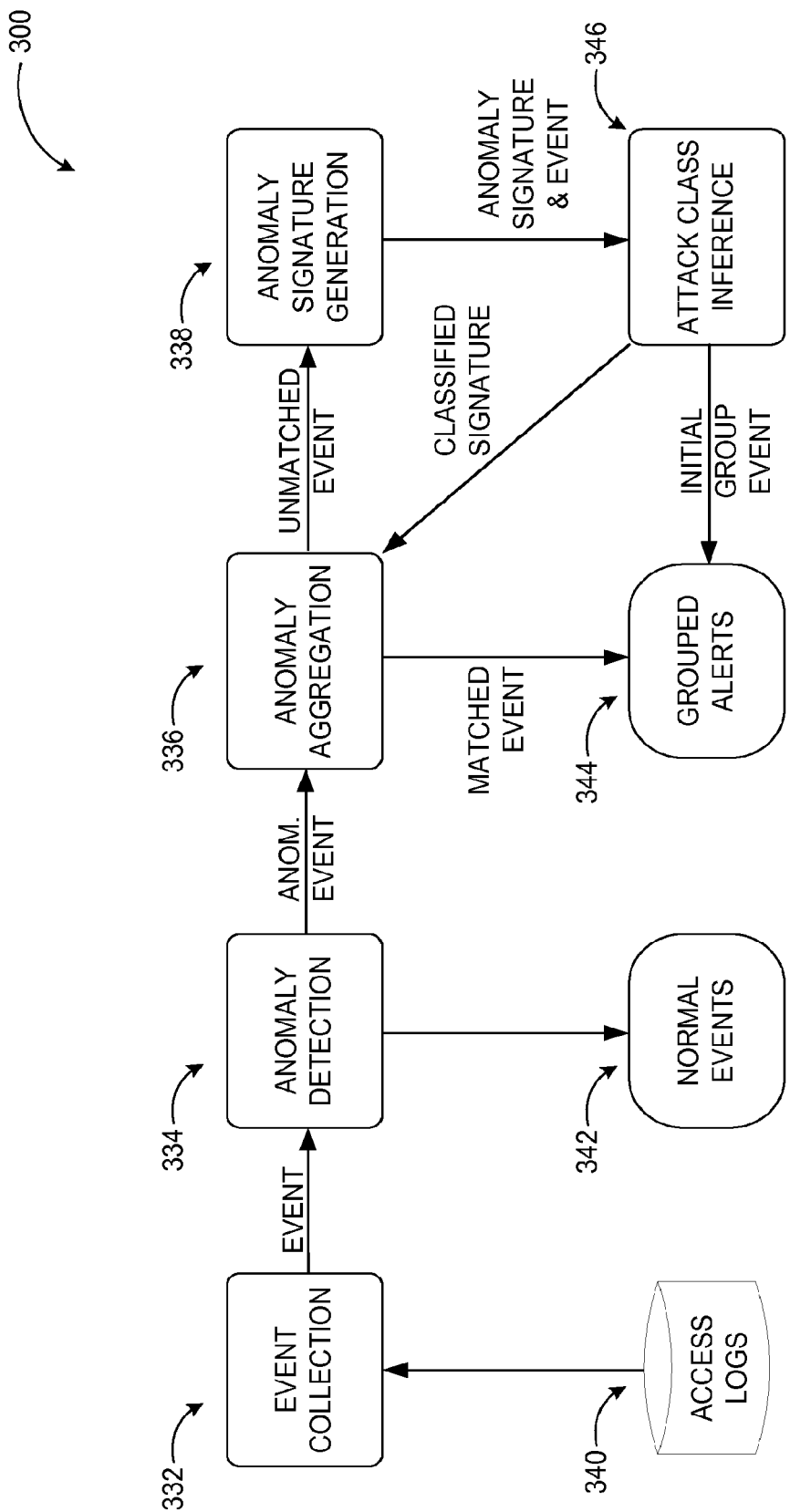
FIG. 3 illustrates an anomaly-based detection system using access logs.

FIG. 3 illustrates an anomaly-based detection system using access logs, arranged in accordance with at least some embodiments described herein. As shown in a diagram 300, the system may collect one or more network events based on information from an access logs database 340 in block 332. When one or more network events are detected, in block 334 the system may determine whether the network events are normal or anomalous. In some embodiments, the determination may be made based on how the events affect overall network traffic, system stability, and/or the ability of the system to deliver service.

If the system determines that the events are normal, in block 342 the system may allow the events to proceed, and then may return to block 332. On the other hand, if the system determines that one or more of the events are anomalous, in block 336 the system may analyze the detected anomalous events to first determine and aggregate the anomalous characteristics (e.g., network traffic patterns) and then determine whether the anomalous characteristics match those of any previously-seen and characterized anomalies. If the anomalous characteristics do not match those of any previously-seen/characterized anomalies, in block 338 the system may generate one or more signatures based on the anomalous characteristics, and then in block 346 the system may infer the type or class of the attack characterized by the anomalous characteristics. For example, if the anomalous characteristics include multiple queries received in quick succession from a large number of sources, the system may infer that the anomalous characteristics represent a denial-of-service (DOS) attack.

Subsequently, the system may provide the generated and classified signatures for use in future anomaly aggregation in block 336, as well as generate an initial group event. If subsequent anomalous events that match the classified signatures are detected in block 336, those anomalous events may be added to the initial group event, and one or more grouped alerts may be transmitted to users and/or system administrators in block 344.

The system described in FIG. 3, while useful for detecting certain network intrusion events, generally collects network data used for detecting large scale network attacks such as DOS attacks, worms, or other things that affect overall network traffic. In particular, because the system described in FIG. 3 bases attack detection on network traffic characteristics and signatures, hacking attacks which do not have a traffic signature (e.g., scripted attacks using buffer overflow and replacing user executables) may not be detected.

In a datacenter, however, cross-user or cross-deployment event correlation may be able to take advantage of particular datacenter traits in order to detect hacking attacks that lack traffic signatures. For example, in many datacenters, operational commands such as permission changes or super-user additions within machines may be visible to virtual machine monitors (also known as "hypervisors"), and these commands may be aggregated across users (which may range into the thousands) and deployments. A server-intrusion system using cross-deployment/cross-user correlation may be able to detect classes of attacks that otherwise may not be detected by a conventional system such that the one described in FIG. 3. For example, command-based zero-day attacks may rely on privilege elevation events (e.g., events granting higher or super-user privileges, such as the modification of a setuid flag associated with an executable in a Unix system) that modify user status or permissions. However, these events cannot be completely blocked because normal users may also need the capability to perform these privilege elevation events at times. A conventional intrusion system configured to monitor these events may generate many false alerts, whereas an intrusion system using cross-deployment/cross-user correlation may only generate an alert if the event is detected across multiple deployments/users and therefore more likely to be a real alert.

Figure 4:
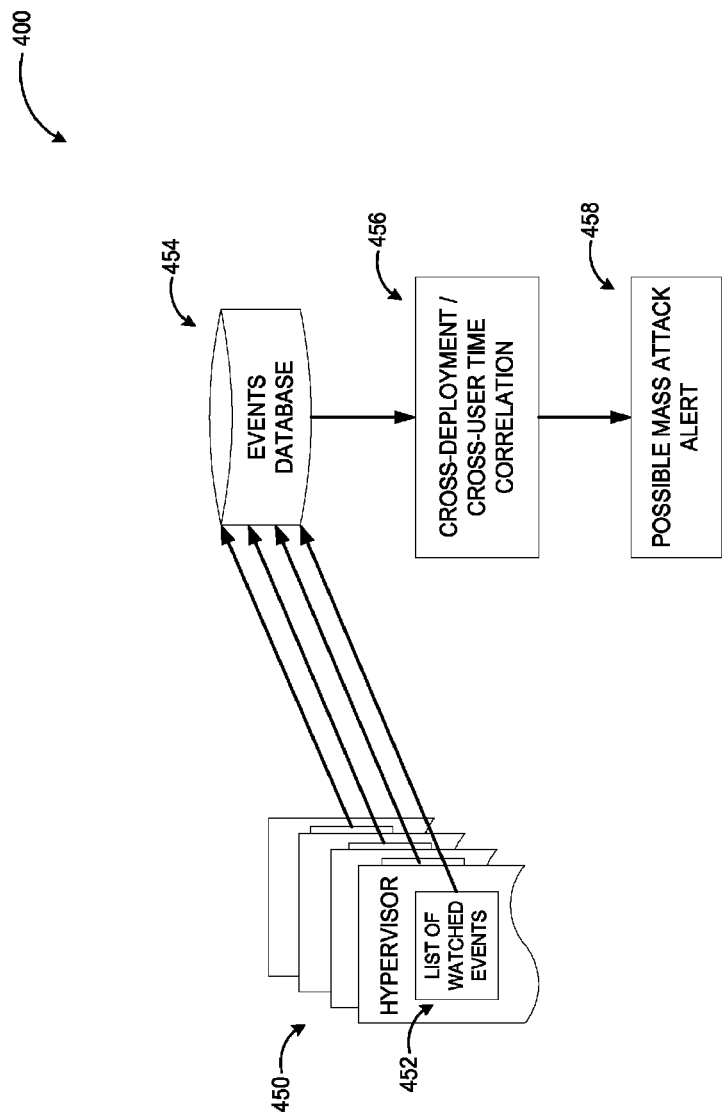
FIG. 4 illustrates how cross-user correlation by virtual machine monitors (hypervisors) may be used to detect server-side multi-target intrusions.

FIG. 4 illustrates how cross-user correlation by virtual machine monitors (hypervisors) may be used to detect server-side multi-target intrusions, arranged in accordance with at least some embodiments described herein. As shown in a diagram 400, one or more virtual machine monitors or hypervisors 450 may each have a list of watched events 452. In some embodiments, watched events may include elevation of privilege (e.g., events granting higher or super-user privileges), replacement of executables in virtual machines, changes to user status or files associated with user status, changes to data files associated with users, or any other administrative event. An observation can also be through programs or elements added to the operating environment of each virtual machine. That is a monitoring strategy used for other purposes in some cases. When the hypervisor 450 detects the occurrence of an event on the list 452, the hypervisor 450 may report the occurrence to an events database 454, which may store significant and/or statistically unusual administrative events (e.g., events on the list of the watched events 452). The events database 454 may then be subject to a cross-deployment/cross-user time correlation to determine groupings of significant/unusual administrative events in block 456, and based on the results of the correlation, in block 458 a possible mass attack alert may be signaled. For example, if the number, frequency, and/or distribution of the detected administrative events exceed a predefined probability threshold, the administrative event may be classified as an attack, and a possible mass attack alert signaled.

In some embodiments described herein, the correlation and grouping determination in block 456 may be adjusted to account for known and expected clustering of significant/ unusual administrative events, such as might occur during operating system or application update rollouts. For example, the known updates may be performed on virtual machines in the datacenter that are disconnected from external communications, and then excluded from the correlation and grouping determination in block 456. In certain embodiments, the possible mass attack alert in block 458 may be linked to automated actions designed to alter the security environment of the datacenter, such as temporary dual-factor user verification, lockdown and reversion of all recently-occurred matching events in the events database 454, and/or notification to customers of potentially compromised machine images. For example, a signaled mass attack alert in block 458 may result in an advisory to customers and a temporary security state that may roll back any virtual machine immediately after a matching event if dual-factor authorization is not obtained, which may potentially allow a zero-day attack to be stopped even before the vulnerability is discovered. In some embodiments, the automated actions may be combined with a side channel (e.g., email) method for authorized users to enable specifically limited actions to provide immediate solutions for zero-day vulnerabilities, potentially before the vulnerabilities are patched or even identified. Similarly, signatures for unusual events may be shared within the datacenter, causing each hypervisor to update its list of watched events to account for the identified attack, as well as shared across datacenters at a summary level, potentially allowing for a cloud-universe-wide halting of zero-day attacks before the vulnerability is even diagnosed.

Figure 5:
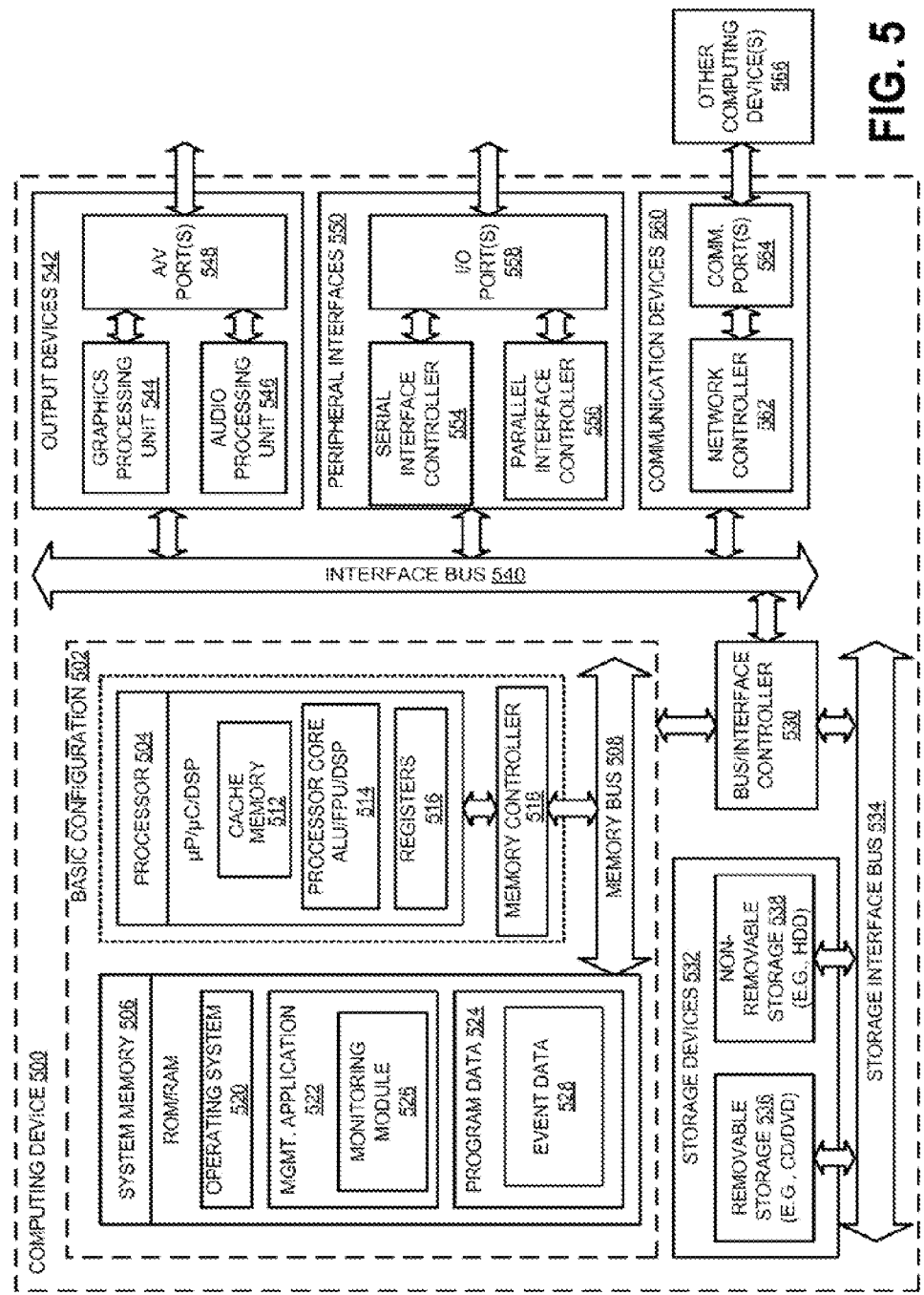
FIG. 5 illustrates a general purpose computing device, which may be used to implement cross-user correlation based detection of server-side multi-target intrusions.

FIG. 5 illustrates a general purpose computing device 500, which may be used to detect server-side multi-target intrusion based on cross-user correlation, arranged in accordance with at least some embodiments described herein. For example, the computing device 500 may be used to detect low-probability administrative events and monitor confluences of administrative events within virtual machines across multiple users and/or deployments as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more management applications 522, and program data 524. The management applications 522 may include a monitoring module 526 for detecting low-probability administrative events within virtual machines across multiple users and/ or deployments as described herein. The program data 524 may include, among other data, administrative event data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile discs (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 562 over a network communication link via one or more communication ports 564. The one or more other computing devices 566 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for detecting server-side multi-target intrusion using cross-user correlation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
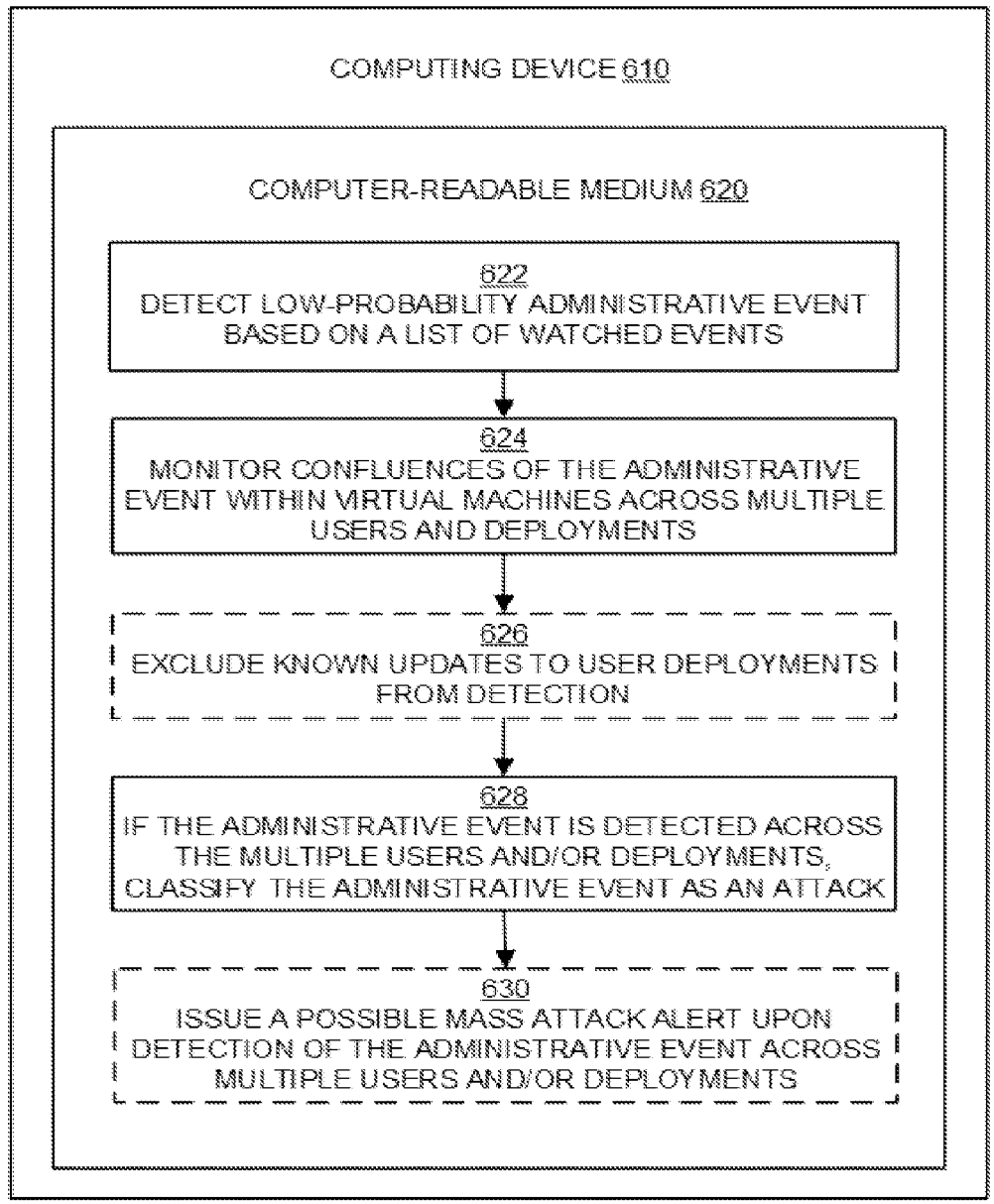
FIG. 6 is a flow diagram illustrating an example method that may be performed by a computing device such as the device in FIG. 5.

FIG. 6 is a flow diagram illustrating an example method for detecting server-side multi-target intrusion using cross-user correlation that may be performed by a computing device such as the device in FIG. 5, arranged in accordance with at least some embodiments described herein. Example methods may include one or more operations, functions or actions as illustrated by one or more of blocks 622, 624, 626, 628, and/or 630, and may in some embodiments be performed by a computing device such as the device 500 in FIG. 5. The operations described in the blocks 622-630 may also be stored as computer-executable instructions in a computer-readable medium such as a computer-readable medium 620 of a computing device 610.

An example process for detecting server-side multi-target intrusion using cross-user correlation may begin with block 622, "DETECT LOW-PROBABILITY ADMINISTRATIVE EVENT BASED ON A LIST OF WATCHED EVENTS", where one or more hypervisors (e.g., the hypervisor 450 in FIG. 4) detect the occurrence of a low-probability administrative event associated with a user. The low-probability administrative event may be included on a list of watched events (e.g., the list of watched events 452 in FIG. 4) associated with the hypervisor, and in some embodiments may include events such as elevation of privilege, replacement of executables in virtual machines, changes to user status or files associated with user status, changes to data files associated with users, or any other administrative event.

Block 622 may be followed by block 624, "MONITOR CONFLUENCES OF THE ADMINISTRATIVE EVENT WITHIN VIRTUAL MACHINES ACROSS MULTIPLE USERS AND/OR DEPLOYMENTS", where the occurrence of the administrative event may be stored in a database (e.g., the events database 454 in FIG. 4), and confluences of the administrative event across multiple users and/or deployments may be monitored using cross-user and/or cross-deployment correlation (e.g., as in block 456 in FIG. 4).

In some embodiments, block 624 may be followed by optional block 626, "EXCLUDE KNOWN UPDATES TO USER DEPLOYMENTS FROM DETECTION", where administrative events resulting from known and expected updates to operating systems and/or applications at the datacenter may be excluded from detection and/or inclusion in the cross-user/cross-deployment correlation procedure. Such events may be any type of expected event. For example, a widespread policy change or an event that is more likely after the end of every billing cycle as people make adjustments may have adjusted probabilities during that time.

Block 624 (or optional block 626 if present) may be followed by block 628, "IF THE ADMINISTRATIVE EVENT IS DETECTED ACROSS THE MULTIPLE USERS AND/OR DEPLOYMENTS, CLASSIFY THE ADMINISTRATIVE EVENT AS AN ATTACK", where if the detected administrative event occurs across multiple users and/or deployments, the administrative event is classified as an attack. For example, if the number, frequency, and/or distribution of the detected administrative event exceed one or more predefined probability thresholds, the administrative event may be classified as an attack.

In some embodiments, block 628 may be followed by optional block 630, "ISSUE A POSSIBLE MASS ATTACK ALERT UPON DETECTION OF THE ADMINISTRATIVE EVENT ACROSS MULTIPLE USERS AND/OR DEPLOYMENTS", where a possible mass attack alert may be issued to the datacenter management and/or one or more datacenter customers if the administrative event is detected across multiple users and/or deployments. In some embodiments, the possible mass attack alert may be linked to automated actions designed to alter the datacenter security environment, as described above in reference to FIG. 4. The automated actions may be combined with a side channel method for authorized users to perform specifically limited actions to address the attack. In certain embodiments, one or more signatures for the administrative event may be shared across multiple datacenters at a summary level, allowing other datacenters to take action.

Figure 7:
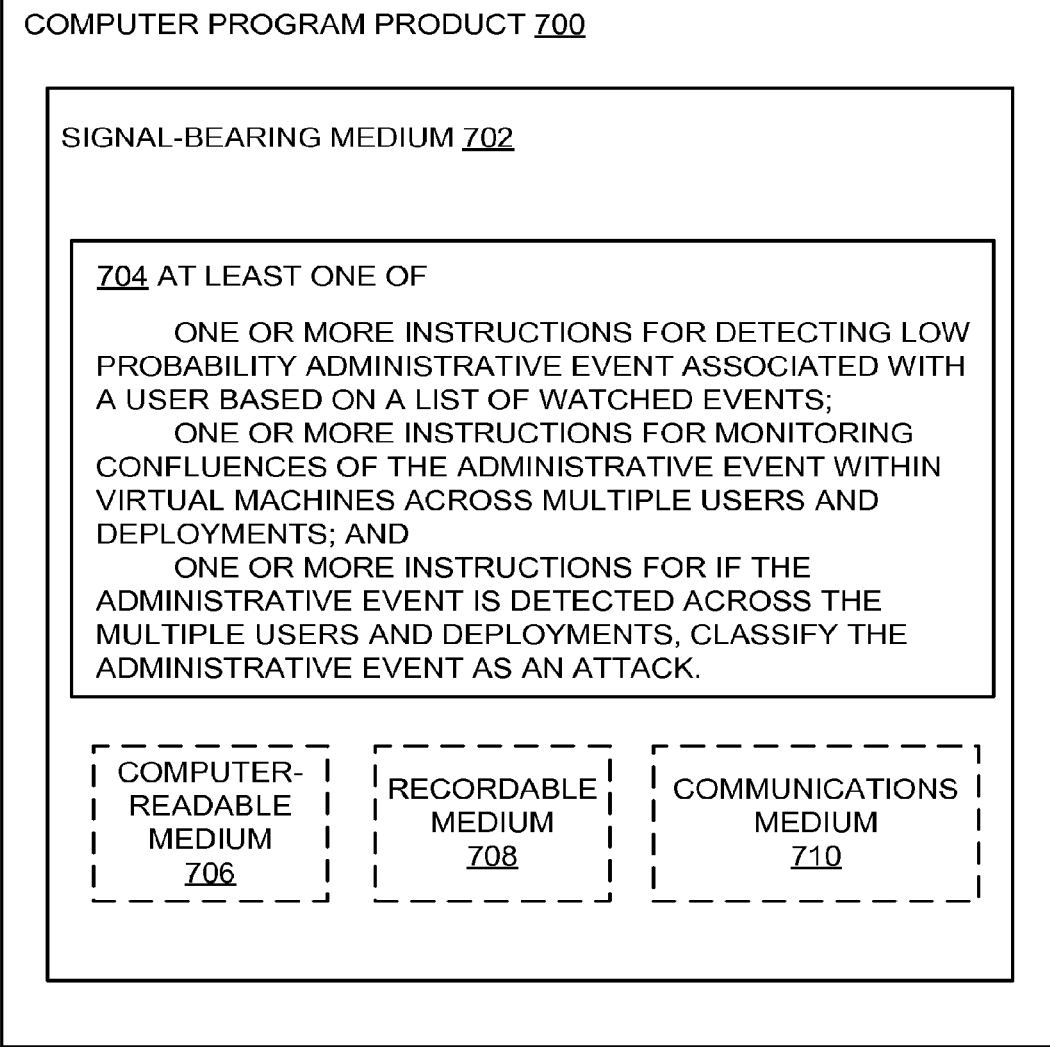
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the management application 522 may undertake one or more of the tasks shown in FIG. 7 in response to the instructions 704 conveyed to the processor 504 by the medium 702 to perform actions associated with detecting server-side multi-target intrusion using cross-user correlation as described herein. Some of those instructions may include, for example, detecting low-probability administrative events, monitoring confluences of the administrative event within virtual machines across multiple users and/or deployments, and/or classifying the administrative event as an attack if detected across multiple users and/or deployments, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile disc (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for detecting server-side multi-target intrusions through cross-user correlation may include detecting a low-probability administrative event associated with a user of a datacenter, monitoring confluences of the administrative event within virtual machines of the datacenter across multiple users and/or deployments, and if the administrative event is detected across the multiple users and/or deployments at a level higher than a predefined probability threshold, classifying the administrative event as an attack.

According to some embodiments, the method may further include detecting the low-probability administrative event based on a list of watched events at each hypervisor of the datacenter. The administrative event may be a change to a user status, a change to a file associated with user status, a replacement of a key executable file associated with a user, and/or a change to a data file associated with the user. The change to the user status may include a permission change and/or a super-user addition within a virtual machine.

According to other embodiments, the method may further include excluding known updates to user deployments from detection. The known updates may be excluded by implementing the known updates on virtual machines disconnected from communications external to the datacenter, based on a list, or based on a data record. In some embodiments, the method may further include issuing a possible mass attack alert upon detection of the administrative event across the multiple users and/or deployments and/or linking the possible mass attack alert to an automated action designed to alter a security environment within the datacenter. The automated action may include a temporary dual-factor user verification, a lockdown, a reversion of recently occurred matching events across the multiple deployments, and/or a notification of user(s) of possibly compromised machine images. The method may further include providing a side-channel technique for an authorized user to enable specifically limited actions to address vulnerabilities.

According to further embodiments, the method may further include updating a list of watched events at each hypervisor of the datacenter for detecting the low-probability event and/or sharing signatures for unusual administrative events across multiple datacenters at a summary level.

According to other examples, a cloud-based datacenter configured to detect server-side multi-target intrusions through cross-user correlation may include a plurality of virtual machines operable to be executed on one or more physical machines, a virtual machine monitor configured to provide access to the plurality of virtual machines and detect a low-probability administrative event associated with a user based on a list of watched events, and a datacenter controller configured to monitor confluences of the administrative event within virtual machines of the datacenter across multiple users and/or deployments, and if the administrative event is detected across the multiple users and/or deployments at a level higher than a predefined probability threshold, classify the administrative event as an attack.

According to some embodiments, the administrative event may be a change to a user status, a change to a file associated with user status, a replacement of a key executable file associated with a user, a change to a data file associated with the user, a transfer, an update of status, an unusual port use, and/or an unusual hardware use. The change to the user status may include a permission change and/or a super-user addition within a virtual machine.

According to other embodiments, the datacenter controller may be further configured to exclude known updates to user deployments from detection. The known updates may be excluded by implementing the known updates on virtual machines disconnected from communications external to the datacenter. In some embodiments, the datacenter controller may be further configured to issue a possible mass attack alert upon detection of the administrative event across the multiple users and/or deployments and/or link the possible mass attack alert to an automated action designed to alter a security environment within the datacenter. The automated action may include a temporary dual-factor user verification, a lockdown, a reversion of recently occurred matching events across the multiple deployments, and/or a notification of user(s) of possibly compromised machine images. The datacenter controller may be further configured to provide a side-channel technique for an authorized user to enable specifically limited actions to address vulnerabilities.

According to further embodiments, the datacenter controller may be further configured to update a list of watched events at each hypervisor of the datacenter for detecting the low-probability event and/or share signatures for unusual administrative events across multiple datacenters at a summary level.

According to further examples, a computer-readable storage medium may store instructions for detecting server-side multi-target intrusions through cross-user correlation. The instructions may include detecting a low-probability administrative event associated with a user of a datacenter, monitoring confluences of the administrative event within virtual machines of the datacenter across multiple users and/or deployments, and if the administrative event is detected across the multiple users and/or deployments at a level higher than a predefined probability threshold, classifying the administrative event as an attack.

According to some embodiments, the instructions may further include detecting the low-probability administrative event based on a list of watched events at each hypervisor of the datacenter. The administrative event may be a change to a user status, a change to a file associated with user status, a replacement of a key executable file associated with a user, and/or a change to a data file associated with the user. The change to the user status may include a permission change and/or a super-user addition within a virtual machine.

According to other embodiments, the instructions may further include excluding known updates to user deployments from detection. The known updates may be excluded by implementing the known updates on virtual machines disconnected from communications external to the datacenter. In some embodiments, the instructions may further include issuing a possible mass attack alert upon detection of the administrative event across the multiple users and/or deployments and/or linking the possible mass attack alert to an automated action designed to alter a security environment within the datacenter. The automated action may include a temporary dual-factor user verification, a lockdown, a reversion of recently occurred matching events across the multiple deployments, and/or a notification of user(s) of possibly compromised machine images. The instructions may further include providing a side-channel technique for an authorized user to enable specifically limited actions to address vulnerabilities.

According to further embodiments, the instructions may further include updating a list of watched events at each hypervisor of the datacenter for detecting the low-probability event and/or sharing signatures for unusual administrative events across multiple datacenters at a summary level.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disc (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect server-side multi-target intrusions through cross-user correlation, the method comprising:
   detecting a low-probability administrative event associated with a user of a datacenter, wherein the administrative event is one or more of a change to a user status, a change to a file associated with user status, a replacement of a key executable file associated with the user, a change to a data file associated with the user, a transfer, an update of status, an unusual port use, and/or an unusual hardware use;
   monitoring confluences of the administrative event within virtual machines of the datacenter across multiple users;
   in response to a determination that the administrative event is detected across the multiple users at a level higher than a predefined probability threshold, classifying the administrative event as an attack;

preventing another attack within the datacenter prior to an identification of a vulnerability of the datacenter, through which the attack occurred, by combining a side channel technique with automated actions, the automated actions designed to alter a security environment within the datacenter and linked to a possible mass attack alert to provide a solution for the attack; and providing one or more signatures generated for the administrative event based on one or more anomalous characteristics of the administrative event to one or more other datacenters within a same cloud such that the one or more other datacenters are enabled to prevent the attack universally within the cloud prior to the identification of the vulnerability of the datacenter.

2. The method according to claim 1, further comprising detecting the low-probability administrative event based on a list of watched events at each hypervisor of the datacenter.

3. The method according to claim 1, wherein the change to the user status includes one or more of a permission change or a super-user addition within a virtual machine.

4. The method according to claim 1, further comprising excluding known updates to user deployments from detection.

5. The method according to claim 4, wherein the known updates are excluded by implementing the known updates on virtual machines disconnected from communications external to the datacenter, based on a list, or based on a data record.

6. The method according to claim 1, further comprising issuing the possible mass attack alert upon detection of the administrative event across the multiple users.

7. The method according to claim 1, wherein the automated actions include one or more of a temporary dual-factor user verification, a lockdown, a reversion of recently occurred matching events across multiple deployments, and/or a notification of one or more users of possibly compromised machine images.

8. The method according to claim 1, further comprising providing the side channel technique for an authorized user to enable specifically limited actions to address the vulnerability.

9. A cloud-based datacenter configured to detect server-side multi-target intrusions through cross-user correlation, the datacenter comprising:
a plurality of virtual machines operable to be executed on one or more physical machines;
a virtual machine monitor configured to:
provide access to the plurality of virtual machines; and
detect a low probability administrative event associated with a user based on a list of watched events, wherein the administrative event is one or more of a change to a user status, a change to a file associated with user status, a replacement of a key executable file associated with the user, a change to a data file associated with the user, a transfer, an update of status, an unusual port use, and/or an unusual hardware use; and
a datacenter controller configured to:
monitor confluences of the administrative event within virtual machines of the datacenter through multiple virtual machine monitors across multiple users;
in response to a determination that the administrative event is detected across the multiple users at a level higher than a predefined probability threshold, classify the administrative event as an attack;

prevent another attack within the datacenter prior to an identification of a vulnerability of the datacenter, through which the attack occurred, by combining a side channel technique with automated actions, the automated actions designed to alter a security environment within the datacenter and linked to a possible mass attack alert to provide a solution for the attack; and provide one or more signatures generated for the administrative event based on one or more anomalous characteristics of the administrative event to one or more other datacenters within a same cloud such that the one or more other datacenters are enabled to prevent the attack universally within the cloud prior to the identification of the vulnerability of the datacenter.

10. The datacenter according to claim 9, wherein the datacenter controller is further configured to
exclude known updates to user deployments from detection.

11. The datacenter according to claim 9, wherein the datacenter controller is further configured to
issue the possible mass attack alert upon detection of the administrative event across the multiple users and/or deployments.

12. The datacenter according to claim 9, wherein the datacenter controller is further configured to
update the list of watched events at each virtual machine monitor of the datacenter for detecting the low probability administrative event.

13. The datacenter according to claim 9, wherein the datacenter controller is further configured to
share signatures for unusual administrative events across multiple datacenters at a summary level.

14. A non-transitory computer-readable storage medium having instructions stored thereon to detect server-side multi-target intrusions through cross-user correlation, the instructions comprising:
detecting a low probability administrative event associated with a user of a datacenter, wherein the administrative event is one or more of a change to a user status, a change to a file associated with user status, a replacement of a key executable file associated with the user, a change to a data file associated with the user, a transfer, an update of status, an unusual port use, and/or an unusual hardware use;
monitoring confluences of the administrative event within virtual machines of the datacenter across multiple users;
in response to a determination that the administrative event is detected across the multiple users at a level higher than a predefined probability threshold, classifying the administrative event as an attack;
preventing another attack within the datacenter prior to an identification of a vulnerability of the datacenter, through which the attack occurred, by combining a side channel technique with automated actions, the automated actions designed to alter a security environment within the datacenter and linked to a possible mass attack alert to provide a solution for the attack; and
providing one or more signatures generated for the administrative event based on one or more anomalous characteristics of the administrative event to one or more other datacenters within a same cloud such that the one or more other datacenters are enabled to prevent the attack universally within the cloud prior to the identification of the vulnerability of the datacenter.

15. The non-transitory computer-readable storage medium according to claim 14, wherein the instructions further comprise detecting the low probability administrative event based on a list of watched events at each hypervisor of the datacenter.

16. The non-transitory computer-readable storage medium according to claim 14, wherein the change to the user status includes one or more of a permission change or a super-user addition within a virtual machine.

17. The non-transitory computer-readable storage medium according to claim 14, wherein the instructions further comprise excluding known updates to user deployments from detection.

18. The non-transitory computer-readable storage medium according to claim 14, wherein the instructions further comprise updating a list of watched events at each hypervisor of the datacenter for detecting the low probability administrative event.

19. The non-transitory computer-readable storage medium according to claim 14, wherein the one or more generated signatures for the administrative event are provided to the one or more other datacenters at a summary level.

\* \* \* \* \*

UNITED STATES PATENT AND TRADEMARK OFFICE
CERTIFICATE OF CORRECTION

PATENT NO. : 9,197,653 B2  Page 1 of 1
APPLICATION NO. : 13/811384
DATED : November 24, 2015
INVENTOR(S) : Kruglick It is certified that error appears in the above-identified patent and that said Letters Patent is hereby corrected as shown below:

In The Specification

In Column 1, Line 9, delete "§371" and insert -- § 371 --, therefor.

In The Claims

In Column 16, Lines 22-23, in Claim 11, delete "users and/or deployments." and insert -- users. --, therefor.

Signed and Sealed this
Twenty-second Day of March, 2016

Michelle K. Lee
*Director of the United States Patent and Trademark Office*